May 12, 1964
E. W. REES
3,132,679
MEAT GRINDER DEVICE
Filed Feb. 16, 1962
2 Sheets-Sheet 1
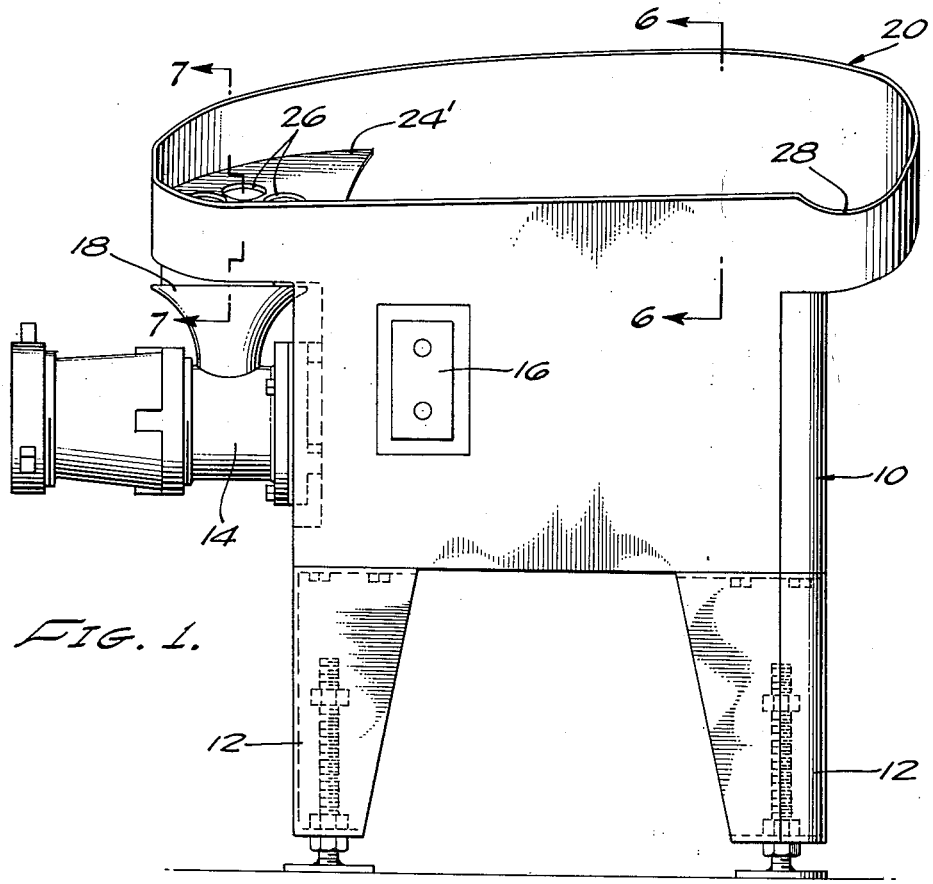
FIG. 1.
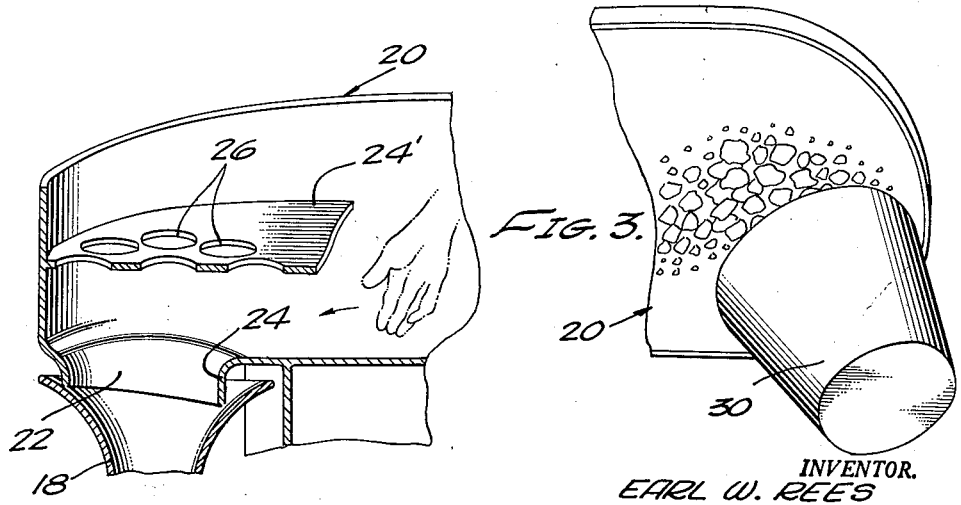
FIG. 5.
FIG. 3.
INVENTOR.
EARL W. REES
BY Lyon & Lyon
ATTORNEYS May 12, 1964
E. W. REES
3,132,679
MEAT GRINDER DEVICE
Filed Feb. 16, 1962
2 Sheets-Sheet 2
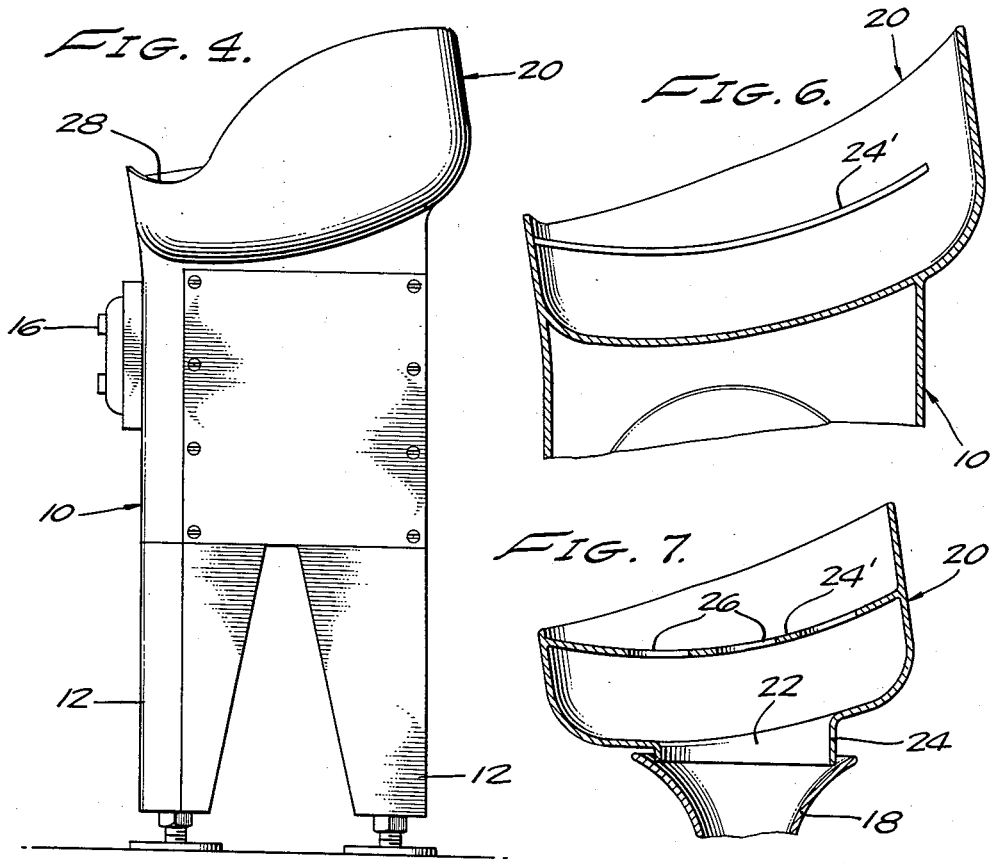
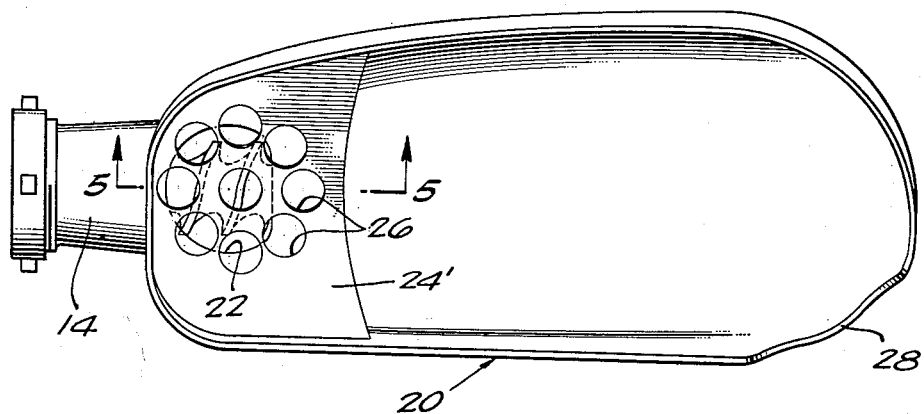
INVENTOR.
EARL W. REES
BY
Lyon & Lyon
ATTORNEYS

United States Patent Office 3,132,679
Patented May 12, 1964

3,132,679
MEAT GRINDER DEVICE
Earl W. Rees, 1210 Shoemaker Ave., Whittier, Calif.
Filed Feb. 16, 1962, Ser. No. 173,749
2 Claims. (Cl. 146—182)

This invention relates to an improved meat grinder and safety attachment therefor.

It is an object of this invention to provide a grinder wherein novel means are provided for feeding meat thereto.

Still a further object of this invention is to provide such a grinder wherein the hands of the operator are protected and shielded from the grinding mechanism.

Other objects and advantages will be readily apparent from the following description.

In the drawings:

FIGURE 1 is a side elevation of a device embodying this invention.

FIGURE 2 is a top plan view of the device.

FIGURE 3 is a fragmentary top plan view illustrating feeding to the device.

FIGURE 4 is an end view of said device.

FIGURE 5 is a view taken along line 5—5 of FIGURE 2.

FIGURE 6 is a view taken along line 6—6 of FIGURE 1.

FIGURE 7 is a view taken along line 7—7 of FIGURE 1.

A frame 10 is supported upon four adjustable legs 12 and supports a meat grinding device 14 driven by an electric motor (not shown) supported within the frame and actuated by switch 16. Meat and the like to be ground are fed to the grinder through a funnel 18.

This invention is directed to the hopper 20 which feeds the meat to funnel 18. The hopper extends from one end of the frame 10 to the other and has the side wall and lower surface thereof slope gradually downwardly to an opening 22 which is flared as at 24 to fit into funnel 18. The sloped surface of the hopper facilitates movement of the material to be ground towards opening 22 as same is mixed and fed manually by the operator.

To guard against operator sticking his hand into the grinder, a safety shield 24 is mounted in the hopper above opening 22. This shield is provided with a series of holes 26 which permit visual inspection. The shield is curved in the same manner as the lower surface of the hopper to avoid interference with the feeding and is spaced above the lower surface of the hopper and covers enough thereof to prevent the operators sticking their hands into the grinder.

The hopper wall may be cut away or notched as at 28 at the end farthest from the grinder to receive a receptacle such as bucket 30 containing material to be ground to facilitate feeding.

While what hereinbefore has been described as the preferred embodiment of this invention, it is readily apparent that alterations and modifications may be resorted to without departing from the scope of this invention and such alterations and modifications are intended to be included within the scope of the appended claims.

I claim:

1. In a meat grinder having a feeding funnel:
an elongated hopper having a bottom wall and upstanding side and end walls; a feed opening in said bottom wall, adjacent one end thereof and overlying said feeding funnel; a safety shield of sheet material overlying said opening and spaced upwardly from and generally parallel to said bottom wall; said shield extending transversely of said hopper from one of said side walls to the other and being supported thereby; the space between said shield and bottom wall being free of any obstructions whereby material to be ground may move freely over any portion of said bottom wall to said opening.

2. A meat grinder as defined in claim 1 wherein said shield is configured so that edges thereof abut the inner face of said side walls and the end wall at said one end; said edges being secured to said walls and comprising the sole support for said shield; a free edge of said shield extending transversely of said hopper, from one side wall to the other, and being farther from said end wall than any portion of said opening.

References Cited in the file of this patent

UNITED STATES PATENTS

| 2,531,158 | Robinson | Nov. 21, 1950 |
| 3,014,515 | Meeker et al. | Dec. 26, 1961 |

FOREIGN PATENTS

| 274,335 | Great Britain | July 21, 1927 |
| 589,169 | Germany | Dec. 5, 1933 |